(12) United States Patent
Oz et al.

(10) Patent No.: US 7,660,328 B1
(45) Date of Patent: Feb. 9, 2010

(54) METHOD AND SYSTEM FOR GENERATING, TRANSMITTING AND UTILIZING BIT RATE CONVERSION INFORMATION

(75) Inventors: Ran Oz, Modiin (IL); Michael Field, San Diego, CA (US); Nery Strasman, Ramat-Gan (IL); Omer Schechter, Modiin (IL)

(73) Assignee: BigBand Networks Inc., Redwood City, CA (US)

( * ) Notice: Subject to any disclaimer, the term of this patent is extended or adjusted under 35 U.S.C. 154(b) by 446 days.

(21) Appl. No.: 09/825,628

(22) Filed: Apr. 3, 2001

(51) Int. Cl.
H04J 3/16 (2006.01)
H04J 3/24 (2006.01)
H04N 11/20 (2006.01)
H04N 7/20 (2006.01)
H04N 7/16 (2006.01)
H04N 11/02 (2006.01)

(52) U.S. Cl. .................. 370/466; 370/474; 348/441; 725/63; 725/144; 375/240.01

(58) Field of Classification Search .......... 370/465, 370/485, 486, 537, 540, 538, 468; 348/441; 725/63, 67, 143–144, 149; 375/240.01, 240.02
See application file for complete search history.

(56) References Cited

U.S. PATENT DOCUMENTS

| | | | |
|---|---|---|---|
| 5,682,195 A | 10/1997 | Hendricks et al. | |
| 5,862,140 A | 1/1999 | Shen et al. | |
| 5,877,812 A | 3/1999 | Krause et al. | |
| 5,877,814 A * | 3/1999 | Reininger et al. | 348/500 |
| 5,926,476 A | 7/1999 | Ghaibeh | |
| 5,956,088 A | 9/1999 | Shen et al. | |
| 5,956,338 A | 9/1999 | Ghaibeh | |
| 6,002,687 A | 12/1999 | Magee et al. | |
| 6,038,256 A | 3/2000 | Linzer et al. | |
| 6,044,396 A * | 3/2000 | Adams | 725/95 |
| 6,075,972 A | 6/2000 | Laubach et al. | |
| 6,094,457 A | 7/2000 | Linzer et al. | |
| 6,108,348 A * | 8/2000 | Strunk | 370/465 |
| 6,115,531 A * | 9/2000 | Yanagihara | 386/67 |
| 6,124,878 A | 9/2000 | Adams et al. | |
| 6,181,711 B1 | 1/2001 | Zhang et al. | |
| 6,192,083 B1 | 2/2001 | Linzer et al. | |
| 6,434,168 B1 * | 8/2002 | Kari | 370/521 |
| 6,434,171 B1 * | 8/2002 | Ishida | 370/537 |
| 6,654,421 B2 * | 11/2003 | Hanamura et al. | 375/240.26 |
| 6,674,480 B2 * | 1/2004 | Nakazawa | 348/459 |
| 6,747,983 B1 * | 6/2004 | Knutson et al. | 370/412 |
| 6,795,506 B1 * | 9/2004 | Zhang et al. | 375/240.26 |
| 6,937,323 B2 * | 8/2005 | Worthington et al. | 356/73 |

\* cited by examiner

Primary Examiner—Nittaya Juntima
(74) Attorney, Agent, or Firm—Pearl Cohen Zedek Latzer, LLP

(57) ABSTRACT

A method and apparatus for generating and transmitting bit rate conversion information to be utilized during bit rate conversion decisions and a method and apparatus for performing bit rate adaptation of media signals to use an available bandwidth of a channel, the media signals being associated with bit rate conversion information, the method for utilizing the bit rate conversion information including the steps of: receiving the media signals and the bit rate conversion information; the bit rate conversion information being indicative of a change in a bit rate of the media signals resulting from bit rate conversion; and converting the multiplexed processed media signals in response to the available bandwidth and the bit rate conversion information.

1 Claim, 10 Drawing Sheets

METHOD AND SYSTEM FOR GENERATING, TRANSMITTING AND UTILIZING BIT RATE CONVERSION INFORMATION

FIELD OF THE INVENTION

The present invention relates to communication systems and especially to methods and systems for generating, transmitting and utilizing bit rate conversion information.

BACKGROUND

Information signals, such as media signals and especially compressed video and audio streams and packetized audio and video streams propagate over various communication channels, such as terrestrial, wireless, satellite and cable communication channels and the like. Video streams usually include a relatively large amount of information and therefore are usually transmitted over communication channels in a compressed form.

The Motion Pictures Expert Group (MPEG) specifications are standardized methods for compressing and transmitting media signals such as video and audio.

As media signals, such as media signal streams, sequences of media signals and the like are transmitted over communication channels there is a need to match the bit rate of the media streams to the available bandwidth of the communication channels. This match usually requires to reduce the bit rate of the media streams. A simple conversion of bit rate that does not take into account the content of the media streams can cause severe quality losses. There are some prior art bit rate conversion methods that take into account the content of the media streams and accordingly offer a lower quality loss than the simple conversion of bit rate. Some of the prior art methods are illustrated in U.S. Pat. No. 6,181,711 of Zhang et al.

A disadvantage of prior art methods for bit rate conversion is that the amount of bit rate conversion achieved by their implementation is unknown. Accordingly, in order to match a bit rate of at least one media stream to the available bandwidth of a channel there is a need to either perform some bit rate conversion iterations or to start with relatively drastic bit rate conversion schemes that can cause a larger than necessary bit rate conversion. The bit rate conversion scheme is further complicated when dealing with multiple media streams, as the bit conversion of one media stream affects the available bandwidth for other media streams.

Very often a media stream is bit rate converted various times during a transmission over at least one communication channel. A further disadvantage of prior art systems and methods of bit rate conversions is that each of these bit rate conversions causes an additional delay. Furthermore, each bit rate conversion is performed regardless to previous bit rate conversions.

The problems resulting from bit rate conversion is more acute in systems such as the system illustrated in FIG. 1, in which many systems implement bit rate conversion schemes on the same media streams.

FIG. 1 illustrates a prior art system 9 for generating, transmitting and receiving digitized programs. A plurality of digitized programs, originating from n media sources 10-$j$, j=1, 2, . . . n are provided to central distribution center 12 that multiplexes the digitized programs to generate at least one primary combined signal. A digitized program includes a plurality of media signals. Usually, central distribution center 12 also performs channel specific encoding and modulation for allowing the transmission of the primary combined signal.

The at least one primary combined signal is transmitted to at least one distribution satellite, such as distribution satellite 14. Distribution satellite 14 re-transmits the at least one primary combined signal to m headends 20-$k$, k=1, 2, . . . m. Usually, distribution satellite 14 has a transponder for converting the frequency of the at least one primary combined signal. Accordingly, a primary combined signal is also referred to as a transponded signal.

Additional control, status and billing information are usually transferred over auxiliary cable networks, such as auxiliary cable network 16.

Headend 20-$k$ is configured to receive at least a single primary combined signal, and to provide at least a selected portion of the received primary combined signal to a plurality of subscribers, such as set top boxes 28-$l$, l=1, 2, . . . t via cable network 30. The selected portion is also referred to as a secondary combined signal and includes at least one selected digitized programs. The secondary combined signal can also be retransmitted to a local distribution satellite (not shown) via a local uplink transmitter, such as transmitter 26.

Each headend is configured to select at least some digitized programs in view of predefined selection information, to analyze the selected digitized programs and to convert the bit rate of some portions of the selected digitized programs in view of the available bandwidth of the downstream channel to which the secondary combined signal is to be provided. The secondary combined signal includes the selected digitized programs, some of which were bit rate converted.

Methods for selecting digitized programs and generating a combined secondary packetized stream are known in the art. The selection is also known as grooming.

Referring to FIG. 1, each headend includes an analyzer (A) 20-$k$-2, a controller (C) 20-$k$-4 and a processor (P) 20-$k$-6, for performing the selection, bit rate conversion and combination process. Analyzer 20-$k$-2 analyses the selected digitized programs to determine the required bit rate for a transmission of each digitized program, and generates information that reflects the amount of either actual or predicted bit rate conversion that can be achieved by applying bit rate conversion techniques. Said analysis can involve a full or partial decoding process of the digitized program. The results of the analysis are provided to controller 20-$k$-4 that also receives bandwidth information being indicative of the available bandwidth of the downstream channel. In view of the additional information controller 20-$k$-4 determines whether to apply bit rate conversion techniques, which technique to apply and to which of the selected digitized programs to apply the bit rate conversion techniques. Controller 20-$k$-4 provides processor 20-$k$-6 instructions that reflect the determination and processor 20-$k$-6 generates the secondary combined signal. The secondary combined signal has a bit rate that is either substantially equal or less than the available bandwidth of the downstream channel through which the secondary combined signal is to be transmitted.

Methods for combining various signals to use an available bandwidth are known in the art. A common method for combining the selected digitized signals is known as statistical multiplexing. U.S. Pat. Nos. 6,192,083, 6,094,457 and 6,038,256 of Linzer et al, describe apparatuses and methods for statistical multiplexed encoding using pre-encoding a-priori and a-postriori statistics. In said patents the analyzer is referred to as either a statistics gatherer, or as a combination of a statistical gatherer and a plurality of encoders.

A single digitized program is received by many headends. A single distribution satellite usually transmits the primary combined signal to thousands of headends. Accordingly, many analyzers analyze the same digitized program. The analysis process is relatively complicated and costly, and directly affects the cost of the headend. The inclusion of an analyzer within each headend is both costly and not effective.

Statistical multiplexing of more than one digitized program is further complicated as the amount of bit rate conversion resulting from an appliance of bit rate conversion schemes on the digitized programs can not be accurately predicted. Accordingly, more than a single bit rate conversion scheme must be applied on the digitized programs before the bit rate conversion results in a match between the bit rate of the secondary combined signal and the available bandwidth of the downstream channel.

A further disadvantage of the prior art methods and apparatuses is that the complexity of each analyzer has to be restrained, in order to reduce the cost of the headend.

There is a need to provide cost effective system and method for performing bit rate adaptation and multiplexing.

SUMMARY OF THE INVENTION

It is an object of the present invention to provide novel methods and systems for bit rate conversion of media. The invention provides a method for generating and transmitting bit rate conversion information, the method including the steps of: receiving a sequence of media signals, the sequence of media signals is to be transmitted over a communication channel; applying at least one bit rate conversion scheme on the sequence of media signals; and analyzing the results of the appliance of the at least one bit rate conversion scheme to provide bit rate conversion information. The bit rate conversion information is utilized during bit rate conversion decisions. The bit rate conversion is conveniently generated once, and can be used by various apparatuses that receive the bit rate conversion information. Furthermore, the bit rate conversion information can reflect an appliance of a sequence of at least two bit rate conversion schemes implemented on media signals, thus providing simplifying successive bit rate conversion schemes implemented on media signals along at least one communication channel.

According to an aspect of the invention, a plurality of media signals, such as media streams, packetized media streams or digitized programs, and the like are provided to a central analyzer, preferably located within a central distribution center. The media signals are analyzed to produce bit rate conversion information being indicative of an amount of compression/bit rate conversion achieved by implementing bit rate conversion schemes on sequences of media signals, such as but not limited to macroblocks, slices, pictures, Group of pictures. Conveniently, the bit rate conversion information also indicates the quality degradation resulting from the bit rate conversion. The bit rate conversion information is multiplexed with the media signals to provide a combined signal, such as an enhanced primary packetized stream that is transmitted to a plurality of local distribution centers, such as cable headends. The local distribution centers optionally select some of the media signals streams, such as digitized programs, to be combined to form a combined signal such as an enhanced secondary packetized stream. The enhanced secondary packetized stream is transmitted over a downstream channel having an available bandwidth. The local distribution centers are configured to match the bit rate of the enhanced secondary packetized stream and the available bandwidth. The bit rate conversion is based upon the bit rate conversion information.

BRIEF DESCRIPTION OF THE DRAWINGS

The present invention will be understood and appreciated more fully from the following detailed description taken in conjunction with the drawings in which.

DETAILED DESCRIPTION

Figure 1:
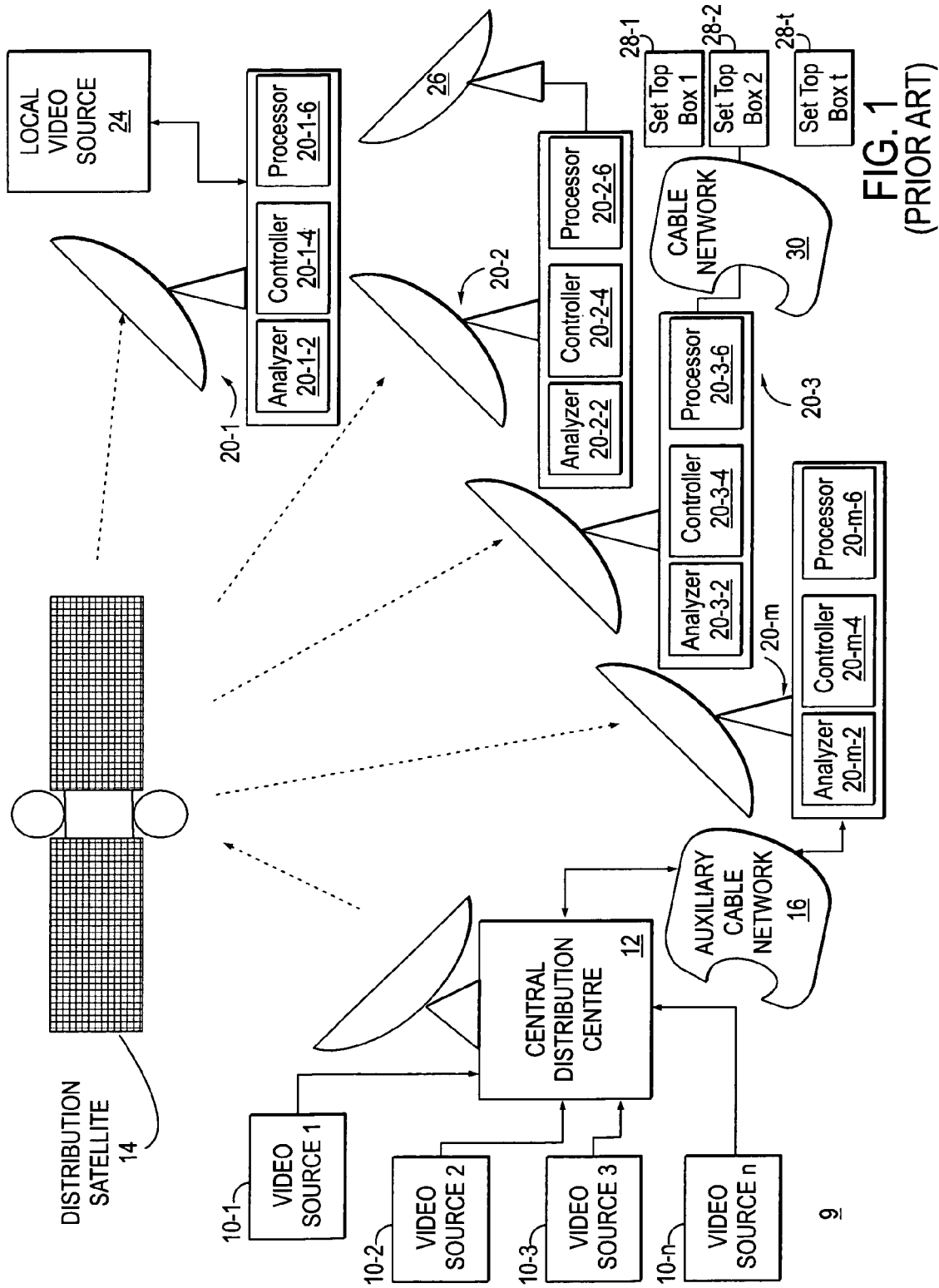
FIG. 1, is a schematic description of a prior art system for transmitting and receiving digitized programs.

The present invention overcomes the disadvantages of the prior art by generating bit rate conversion information to be later utilized during bit rate conversion decisions. The bit rate conversion decisions can be responsive to additional criteria, such as but not limited to priority, delay sensitivity, jitter sensitivity and the like.

The bit rate conversion information reflects the results of applying at least one of the following bit rate conversion schemes: removing filler packets; removing filler frames; removing stuffing bits; selectively scaling DCT coefficients to zero; selectively setting DCT coefficients to zero; discarding data used to represent selected media frames; discarding data used to represent selected media frames and generating repeat information in the bit stream such that a decoder can repeat the dropped frames; re-quantizing quantized DCT coefficients; extracting and changing the quantization scale factors; decode and encode at different bit rates; and changing the resolution of a video image.

The bit rate conversion information can relate to at least one of the following aspects of the bit rate conversion, such as the amount of compression/bit rate conversion and to quality degradation. According to an aspect of the invention the bit rate conversion information is further associated with additional bit rate conversion criteria such as media signal priority, delay sensitivity, quality degradation sensitivity, and the like.

The bit rate conversion information can relate to various media signals and various forms, groups, packets, sequences, streams, packetized streams of media signals. The bit rate conversion information can be incorporated, multiplexed with the media signals it is associated with, and can be transmitted prior to the transmission of the media signals it can be associated with. For example, the bit rate conversion information can be placed within MPEG transport packets, conveniently within the MPEG transport packet header and especially within the adaptation field of the MPEG transport packet header. The bit rate conversion information can be sent through the same communication channel as the media signals, but this is not necessary.

Bit rate conversion information can reflect the results of the appliance of a sequence of bit conversion schemes on the same sequence of media signals. Conveniently, the bit rate conversion information can be modified during bit rate conversions to reflect the bit rate conversions. For example, when a first bit rate conversion scheme out of a sequence of bit rate conversion schemes is applied on a sequence of media signals, the bit rate conversion information reflecting the results of the sequence can be updated such as to discard bit rate conversion information relating to the first bit rate conversion. According to yet another aspect of the invention, bit rate conversion information can reflect previous bit rate conversion schemes, for example by not discarding bit rate conversion information relating to previous bit rate conversion schemes.

Media signals can be at least one of the following signals: signals representative of visual information; compressed signals representative of visual information; MPEG compliant signals; signals representative of audio information; compressed signals representative of audio information; information signals associated with signals representative of visual information; information signals associated with compressed signals representative of visual information; information signals associated with MPEG compliant signals; information signals associated with signals representative of audio information; information signals associated with compressed signals representative of audio information; and sequences of media signals originating from at least one media source.

A sequence of media signals includes media signals originating from at least one media source. For example, a sequence of media signals can include a plurality of multiplexed digitized programs, as a sequence of MPEG transport packets that include signals originating from various elementary streams. A sequence of media signals can have various forms, such as but not limited to at least one media stream, at least one packetized media stream and the like. Usually, the media signals originating from various media sources can be separated from each other. Thus, allowing to distinctly process media signals originating from distinct media sources. For example, most headends are configured to perform grooming, in which various digitized programs are retransmitted and other digitized programs are "dropped".

Conveniently, media signals and the bit rate conversion information are transmitted to multiple receivers. According to one aspect of the invention, the apparatus for generating bit rate conversion information is functionally located within a central distribution center and the receivers are local distribution centers, such as headends.

The invention provides a method for generating and transmitting bit rate conversion information, the method including: receiving a sequence of media signals, the sequence of media signals is to be transmitted over a communication channel; applying at least one bit rate conversion scheme on the sequence of media signals; analyzing the results of the appliance of the at least one bit rate conversion scheme to provide bit rate conversion information.

The invention provides an apparatus for generating and transmitting bit rate conversion information, the apparatus including: at least one bit rate converter for receiving a sequence of media signals to be transmitted over a communication channel, and for applying at least one bit rate conversion scheme on the sequence of media signals to provide a bit rate converted sequence of media signals; at least one bit rate conversion analyzer, coupled to the at least one bit rate converters, for receiving and analyzing the bit rate converted sequence of media signals and providing bit rate conversion information. Conveniently, the apparatus further has a transmitter and/or a multiplexer. The transmitter for receiving and transmitting over the communication channel at least a portion of the bit rate conversion information. The multiplexer for receiving and multiplexing media signals, such as media signal sequences or media streams, and at least a portion of the bit rate conversion information. According to another aspect of the invention the apparatus further includes at least one pair of bit rate converter and bit rate conversion analyzer that are configured to apply a sequence of bit rate conversion schemes on a sequence of media signals or on at least one media stream and to provide bit rate conversion information indicative of results of the appliance of the sequence of bit rate conversion schemes on the sequence of media signals or the at least one media stream.

The invention provides an apparatus for generating and transmitting bit rate conversion information, the apparatus including: at least one bit rate converter for receiving at least one stream of media signals to be transmitted over a communication channel, and for applying at least one bit rate conversion scheme on the at least one media stream to provide at least one bit rate converted media signal; at least one bit rate conversion analyzer, coupled to the at least one bit rate converters, for receiving and analyzing the at least one bit rate converted media streams and for providing bit rate conversion information.

The invention provides an apparatus for modifying a bit rate of a sequence of media signals such that the bit rate of the sequence of media signals does not exceed an available bandwidth of a communication channel, the apparatus including: a controller, coupled to the bit converter, for receiving bit rate conversion information and bandwidth information and for determining whether to convert the bit rate of the sequence of media signals in response to the bandwidth information and the bit rate conversion information; and a bit rate converter, coupled to the controller, for receiving the sequence of media signals, and for converting the bit rate of the sequence of media signals, in response to the determination.

The invention provides an apparatus for modifying a bit rate of a sequence of media signals wherein the media signals sequence includes of at least two sequences of media signals, whereas each sequence of the at least two media signals sequences is associated with a bit rate conversion information. Each of the at least two sequences of media signals is representative of at least a portion of a program. Conveniently, the apparatus is configured to select at least one of the at least two sequences to be provided to the communication channel.

The invention provides a method for generating and transmitting bit rate conversion information further including a step of transmitting at least a portion of the bit rate conversion information over the communication channel. Conveniently, the step of transmitting at least a portion of the bit rate conversion information is preceded by a step of multiplexing the at least portion of the bit rate conversion information with the sequence of media signals.

The invention provides a method for generating and transmitting bit rate conversion information wherein the steps of applying and analyzing are repeated to produce bit rate conversion information indicative of results of an appliance of a sequence of bit rate conversion schemes on the sequence of media signals. Conveniently, the method further includes the steps of: transmitting the bit rate conversion information and the media signals sequence until there is a need to convert the bit rate of the media signals sequence by applying a first bit rate conversion scheme out of the sequence of bit rate conversion schemes; and applying the first bit rate conversion scheme, and discarding bit rate conversion information relating to the first bit rate conversion information to provide modified bit rate conversion information.

The invention provides a method for generating and transmitting bit rate conversion information further including the steps of: transmitting the bit rate conversion information and the at least one media stream until there is a need to convert the bit rate of a media stream out of the at least one media streams by applying a first bit rate conversion scheme out of the sequence of bit rate conversion schemes; and applying the first bit rate conversion scheme, and discarding bit rate conversion information relating to the first bit rate conversion information to provide modified bit rate conversion information.

The invention provides a method for modifying a bit rate of a sequence of media signals such that the bit rate of the sequence of media signals does not exceed an available bandwidth of a communication channel, the method including the steps of: receiving the media signal sequence, bandwidth information and bit rate conversion information; determining whether to convert the bit rate of the sequence of media signals in view of bandwidth information and the bit rate conversion information; and converting the bit rate of the sequence of media signals in response to the determination.

The invention provides a method for modifying a bit rate of a sequence of media signals such that the bit rate of the sequence of media signals does not exceed an available bandwidth of a communication channel further including the steps of: transmitting the bit rate conversion information and the at least one media stream until there is a need to convert the bit rate of a media stream by applying a first bit rate conversion scheme out of the sequence of bit rate conversion schemes; and applying the first bit rate conversion scheme, and discarding bit rate conversion information relating to the first bit rate conversion information to provide modified bit rate conversion information.

The invention provides a central analyzer for generating bit rate conversion information, the bit rate conversion information is sent to local distribution centers that base bit conversion decisions upon the bit rate conversion information, thus eliminating the need to place relatively costly analyzers within each local distribution center.

For convenience of explanation, the various letters used as indexes are listed below:

The index j ranges between 1 and n and is used to indicate a serial number of a media source or of an apparatus that is adapted to handle media signals that originate from the j'th media source.

The index l ranges between 1 and t and is used to indicate the serial number of a set top box out of t set top boxes interconnected to cable network 30.

The index k ranges between 1 and m and is used to indicate the serial number of a headend out of m headends, and to indicate apparatuses, such as a controller or a processor that belong to the headend.

The index w ranges between 1 and Q and is used to indicate a serial number of a transport packet.

The index z ranges between 1 and R and is used to indicate various information fields, such as macroblocks and bit rate conversion information fields, included within a single transport packet.

The index y ranges between 1 and Y and is used to indicate various information fields, such as macroblocks and bit rate conversion information fields, included within a single transport packet.

The index p ranges between 1 and S is used to indicate a serial number of a group of bit rate conversion units. The members of each group of bit rate conversion units are conveniently coupled in parallel and are configured to handle media signals from a single media source.

The index f ranges between 1 and U and is used to indicate a serial number of a bit rate conversion information generator within a group of bit rate conversion information generators. The members of each group of bit rate conversion information generators are conveniently coupled in parallel and are conveniently configured to handle media signals from a single media source.

The index h ranges between 1 and V and is used to indicate a serial number of a bit rate conversion unit within a group of bit rate conversion units. V can be either smaller or equal to U, as each headend can support at least some, but not necessary all, the bit rate conversion schemes supported by the central distribution center.

The index d ranges between 1 and B and is used to indicate a serial number of a bit rate conversion information generator and is used to indicate the serial number of a bit rate conversion unit.

Figure 2:
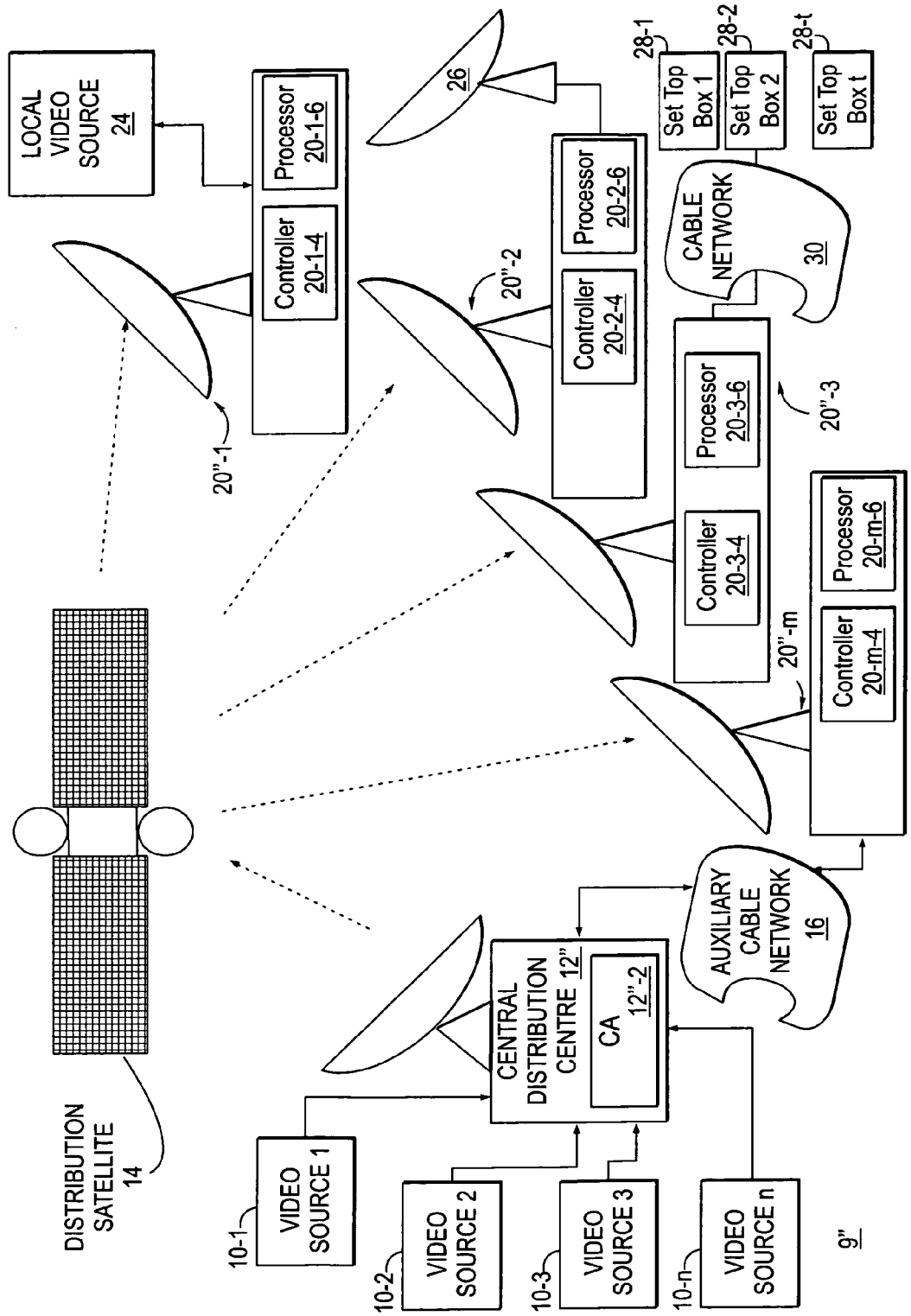
FIG. 2 is a schematic description of a system for transmitting and receiving digitized programs, in accordance with preferred embodiments of the present invention.

Reference is now made to FIG. 2, which is a schematic illustration of system 9" for transmitting and receiving media signals such as digitized programs, according to a preferred embodiment of the invention. A digitized program conveniently includes sequences of media signals, such as audio signals, visual signals, audiovisual signals, data, control and status signals and bit rate conversion information. Conveniently, the sequences are arranged as packets, and preferably are arranged at fixed sized MPEG compliant transport packets.

For convenience of explanation only, FIGS. 2-10 illustrate a systems and methods for generating, transmitting and utilizing bit rate conversion information that relate to MPEG compliant digitized programs that are sent from a central distribution center and received by a plurality of headends. It is noted, for the purpose of the present invention that media signals, bit rate conversion information, the relationship between the bit rate conversion information and the media signals, the amount and characteristics of the communication channels, the apparatuses for generating, transmitting and utilizing the bit rate conversion information can greatly vary, as illustrated at the preface of the detailed description of the drawings.

System 9" includes n media sources 10-j, j=1, 2, . . . n; central distribution center 12" having a central analyzer CA 12"-2, distribution satellite 14, m headends 20"-k and auxiliary cable network 16. System 9" is coupled to various transmission, retransmission and reception entities such as but not limited to cable network 30, t set top boxes 28-l, l=1, 2, t, transmitter 26, and local media source 24.

According to one aspect of the invention, digitized programs from media sources 10-j are provided to a central analyzer (CA) 12"-2, that is conveniently located at central distribution center 12". Central analyzer applies various bit rate conversion techniques on each digitized program and generates bit rate conversion information. The bit rate conversion information is multiplexed with the digitized programs to provide at least one enhanced primary combined signal.

According to a preferred embodiment of the invention, the bit rate conversion information indicates the compression and accordingly bit rate conversion achieved by implementing at least one of the following techniques: removing filler packets; removing filler frames; removing stuffing bits; selectively scaling DCT coefficients to zero; selectively setting DCT coefficients to zero; discarding data used to represent selected media frames; discarding data used to represent selected media frames and generating repeat information in the bit stream such that a decoder can repeat the dropped frames; re-quantizing quantized DCT coefficients; extracting and changing the quantization scale factors; decode and encode at different bit rates; and changing the resolution of a video image. The bit rate conversion information can be generated during any of the following preprocessing steps: encoding, pre-encoding, partially encoding, decoding, partial decoding, pre-decoding, quantization, re-quantization, motion compensation, transforming and inverse-transforming.

Figure 3:
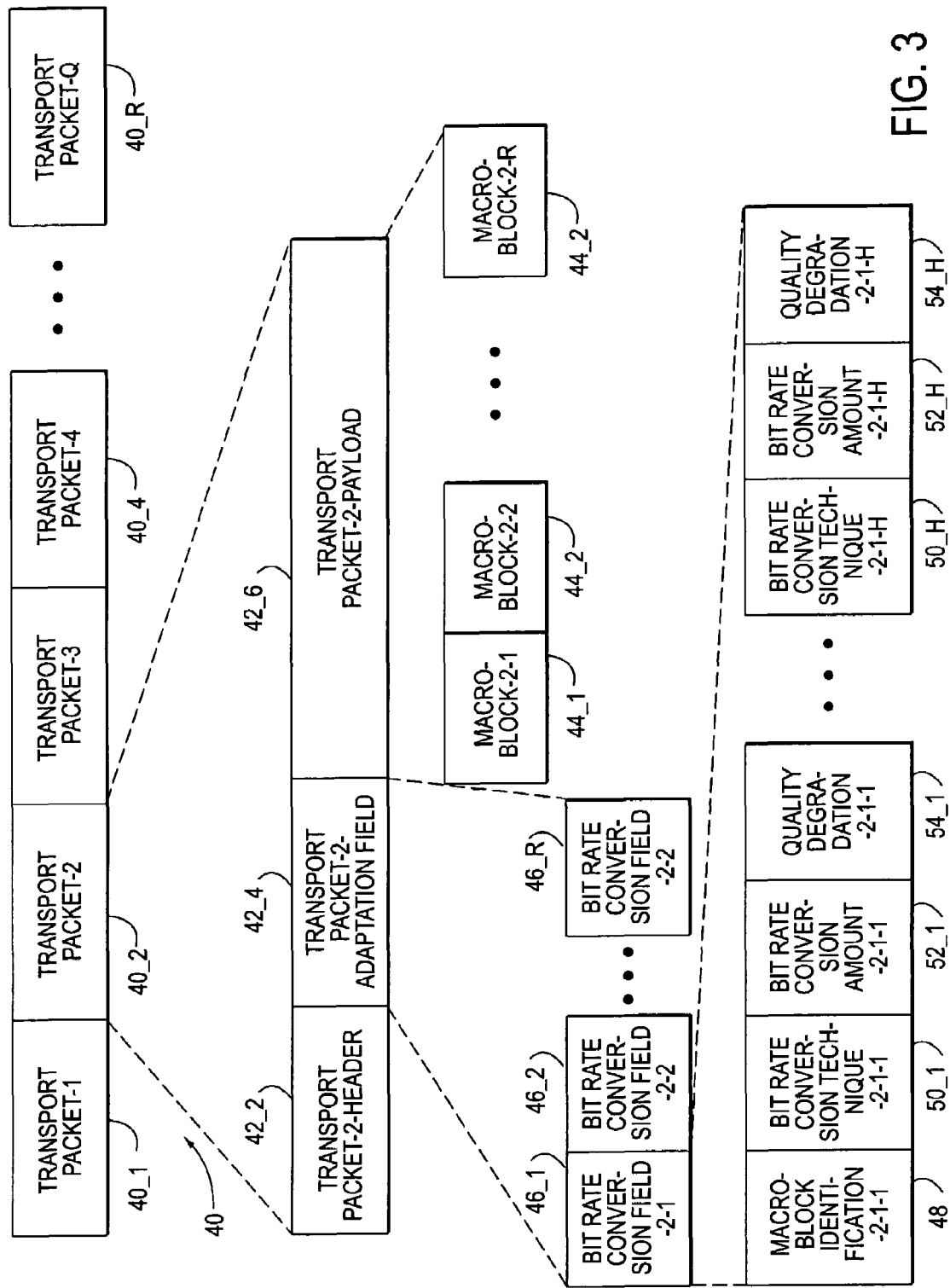
FIGS. 3-4 are schematic illustrations of some portions of the enhanced primary and secondary packetized streams, according to a preferred embodiment of the invention.

According to an aspect of the invention, the bit rate conversion information can relate to macroblocks, pictures, group of pictures, a digitized program, MPEG transport packet, a set of MPEG transport packets, or any sequence or sub-sequence of signals. The bit rate conversion information is multiplexed with the sequence of compressed media signals to generate at least one enhanced primary combined signal. Conveniently, the bit rate conversion information is transmitted by central distribution center 12" not later than the transmission of the sequence of compressed media signals that it refers to. As illustrated at FIG. 3, bit rate conversion information is placed within an MPEG transport packet such that it refers to the bit rate conversion achieved by implementing bit rate conversion techniques on at least some portions of the MPEG transport packet. Usually the bit rate conversion techniques reduce the amount of bits, but this is not necessary.

According to a further aspect of the invention the bit rate conversion information also indicates a quality degradation resulting from the bit rate conversion. For example, the quality degradation can be illustrated by various criteria, such as but not limited to image definition, limiting resolution, gray scale and signal to noise ratio. The quality degradation can also be numerically estimated by comparing various aspects of the media signals before and after the bit rate conversion, For example, the quantization scale before and after the bit rate conversion, the number of DCT coefficients before and after the bit rate conversion, and the like.

For convenience of explanation only, CA 12"-2 is placed within central distribution center 12", although it can be placed in other locations, as long that the analysis process take places before the transmission of the enhanced primary combined signal.

According to an aspect of the invention, headends 20"-k do not have an analyzer, as they receive the bit rate conversion information. According to another aspect of the invention, headends 20"-j have a relatively simple and cheap analyzer for allowing to analyze information received from additional information sources, such as media local source 24.

Each headend 20"-k includes a controller (C) 20-k-4 and a processor (P) 20-k-6, for performing the selection, bit rate conversion and combination process. The bit rate conversion information is provided to controller 20-k-4 that also receives bandwidth information being indicative of the available bandwidth of the downstream channel. In view of the bandwidth and bit rate conversion information, controller 20-k-4 determines whether to apply bit rate conversion techniques, which technique to apply and to which of the selected digitized programs to apply the bit rate conversion techniques. Conveniently, controller 20-k-4 is provided with additional information relating to channel priority, various headend policies and predefined program related criteria and the like. Accordingly, the determination is further based on the additional information.

Controller 20-k-4 provides processor 20-k-6 instructions that reflect the determination. Processor 20-k-6 generates an enhanced secondary combined signal that has a bit rate that is either substantially equal or less than the available bandwidth of the downstream channel. Controller 20-k-4 can apply various bit allocation schemes in view of various criteria, such as, but not limited to, a priority assigned to each sequence of digital signals and a quality degradation resulting in the bit rate conversion.

According to a further aspect of the invention, processor 20-k-6 is configured to execute at least some of the bit rate conversion schemes that were performed by the central analyzer, such that when controller 20-k-4 decides to reduce the bit rate of a sequence of media signals by a certain bit rate conversion scheme, that scheme can be executed by processor 20-k-6. Conveniently, headends 20-k are configured to send central distribution center 12" bit rate conversion scheme information being indicative of bit rate conversion schemes they are able to execute, so that central distribution center 12" does not transmit bit rate conversion information relating to bit rate conversion schemes that can not be executed by at least one of headends 20-k.

Figure 4:
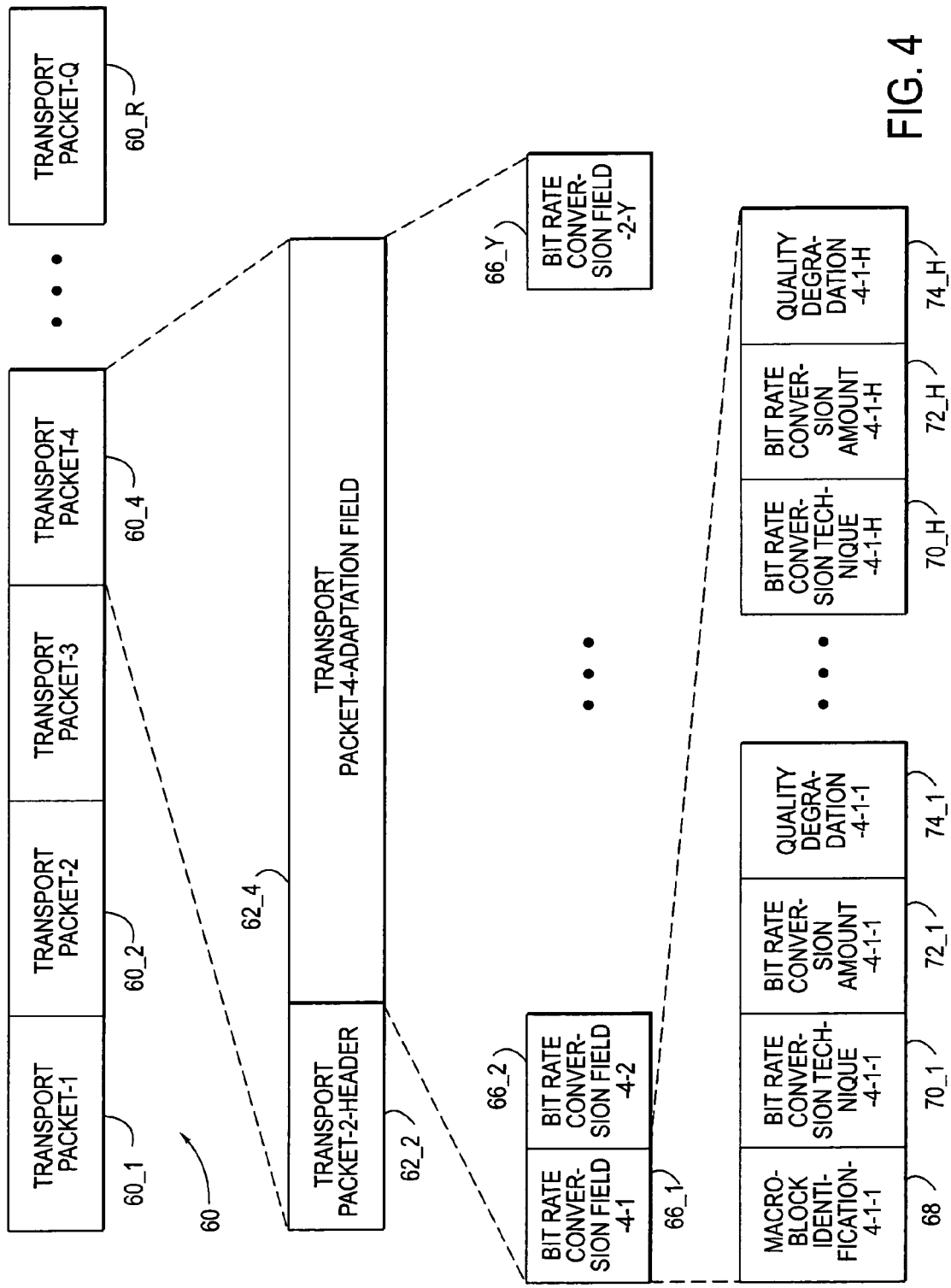

FIGS. 3 and 4 are schematic diagrams illustrating portions of an MPEG transport packets that include bit rate conversion information, according to a preferred embodiment of the invention.

The following description addresses MPEG compliant transport packets in which bit rate conversion information refers to macroblocks and is placed within an adaptation field of MPEG compliant transport packet. It is noted, for the purpose of the invention that (a) the media signals can be representative of visual information and/or audio, and can include status control and various types of additional information signals, (b) the signal can be of various forms such as in raw form, a compressed form, whether MPEG compliant or not, (c) the bit rate conversion information can relate to various sequences of media signals other than macroblocks, and (d) the bit rate conversion information can be either multiplexed with the media information or associated with the media information in various manners.

In accordance with MPEG transmission standard, continuous elementary streams carrying audio or video signals from compressors are broken into packets known as PES (packetized elementary stream) packets. Each PES packet includes a PES header and a PES payload. The PES packets are of a variable length and are usually converted to fixed sized packets known as transport packets. Each transport packet, such as transport packets TP-w numbered 40-w, w=1, 2, . . . , Q includes a transport packet header and a transport packet payload. The transport packet header includes various fields such as a packet identifier for identifying the particular service component carried by the transport packet. A transport packet header can also include an adaptation field that provides additional information about the content of the transport packet payload. According to one aspect of the invention, the adaptation information includes bit rate conversion information. For example, transport packet TP-2 includes packet header TP-2-HDR 42_2, an adaptation field TP-2-ADPT 42_4 and transport packet payload TP-2-PYLD 42_6. TP-2-PYLD includes R macroblocks MB-2-z numbered 44_z, z=1, 2, . . . R. Adaptation field TP-2-ADPT 42_4 includes R groups of bit rate conversion fields MD-2-z numbered 46_z, whereas the z'th group of bit rate conversion field includes bit rate conversion information relating to the z'th macroblock MB-2-z. For example, the first group of bit rate conversion fields of adaptation field TP-2-ADPT includes a macroblock identification field DS-2-1-1 48, and H sub-groups of bit rate conversion fields, each of the sub groups relates to the results of an application of a bit rate conversion scheme on the macroblock identified by DS-2-1-1. The first sub-group includes a bit rate conversion technique field BRT-2-1-1 for indicating a bit rate conversion technique that was applied on MB-2-1, a bit rate conversion amount field BRA-2-1 for indicating the amount of bit rate conversion achieved by the application of the bit rate conversion technique, and a quality degradation field QD-2-1-1 being indicative of a quality loss resulting from the appliance of the bit rate conversion technique.

According to another aspect of the invention, media signals undergo a sequence of at least two bit rate conversions, by at least one bit conversion scheme. The bit rate conversion information indicates the bit rate conversion achieved at each stage of the sequence of the at least two bit rate conversions. Conveniently, when a media stream is bit rate reduced according to one of the bit rate conversion schemes, during a transmission over a communication channel, the bit rate conversion relating to that bit rate conversion scheme can be discarded, while the bit rate conversion information relating to the other bit rate conversion schemes of the sequence are further sent along the communication channel, to be used during consecutive bit rate conversions. For example, assuming that the macroblock identified by DS-2-1-1 was bit rate converted at central distribution center 12 by a sequence of two bit rate conversion schemes, and that the bit rate conversion information referring to that sequence is held in fields BRT-2-1-1, BRA-2-1-1, QD-2-1-1, BRT-2-1-2, BRA-2-1-2 and QD-2-1-2, then BRT-2-1-1, BRA-2-1-1 and QD-2-1-1 indicate the first bit rate conversion scheme of the sequence, the amount of bit rate conversion achieved by applying said first bit rate conversion scheme and the associated quality loss respectively. BRT-2-1-2, BRA-2-1-2 and QD-2-1-2 indicate the first and second bit rate conversion scheme of the sequence, the amount of bit rate conversion achieved by applying the second bit rate conversion scheme after the first bit rate conversion was applied first and the associated quality loss respectively. Assuming that headend 20"-2 receives the macroblock identified by DS-2-1-1 and applies the first bit rate conversion scheme, then it can retransmit the bit rate converted macroblock via transmitter 26, without BRT-2-1-1, BRA-2-1-1 and QD-2-1-1, and modify BRT-2-1-2 to identify only the second bit rate conversion scheme.

FIG. 4 illustrates a plurality of transport packets TP-w 60-w, and especially some portions of transport packet TP-4 60-4. TP-4 includes header TP-4-HDR 62_2, and an adaptation field TP-4-ADPT 62_4. The adaptation field includes bit rate conversion information fields that are associated with media sequences, such as macroblocks and the like, that are located in other MPEG transport packets. For example, adaptation field TP-4-ADPT 62_4 includes Y groups of bit rate conversion fields MD-2-y, y=1, 2, . . . Y numbered 46_y, whereas the y'th group of bit rate conversion field includes bit rate conversion information relating to the y'th macroblock out of a plurality of macroblocks that are placed within at least a single transport packet. The first group of bit rate conversion fields of adaptation field TP-4-ADPT includes a macroblock identification field DS-4-1-1 68, and H sub-groups of bit rate conversion fields, each of the sub groups relates to the results of an application of a bit rate conversion scheme on the macroblock identified by DS-4-1-1. The first sub-group includes a bit rate conversion technique field BRT-4-1-1 for indicating a bit rate conversion technique that was applied on MB-4-1, a bit rate conversion amount field BRA-4-1 for indicating the amount of bit rate conversion achieved by the application of the bit rate conversion technique, and a quality degradation field QD-4-1-1 being indicative of a quality loss resulting from the appliance of the bit rate conversion technique.

Usually, the conversion technique field BRT-2-1 includes coded information that indicates a bit rate conversion technique and if necessary it also includes at least one additional parameter associated with the technique. TABLE 1 illustrates the content of some exemplary bit rate conversion techniques fields and the associated bit rate conversion techniques. Variables X1-X5 represent various criteria or parameter associated with the bit rate conversion techniques. For example, X1 is a threshold value and DCT coefficients that are smaller than X1 are scaled to zero, X4 indicates a new quantization scale, and X3 indicates which type of frame, such as a B-frame or a P-frame, to discard. X1-X5 can be predetermined and can be dynamically changed. A change of a parameter out of X1-X5 requires to configure bit rate conversion units and the bit rate conversion information generators.

TABLE 1

| Content of BRT-2-1 | Bit rate conversion technique field |
|---|---|
| Removing filler packets | 1 |
| Removing filler frames | 2 |
| Removing stuffing bits | 3 |
| Selectively scaling DCT coefficients to zero, whereas selection criteria being X1 | 4, X1 |
| Selectively setting DCT coefficients to zero; whereas selection criteria being X2 | 5, X2 |
| Discarding data used to represent selected media frames; whereas selection criteria being X3 | 6, X3 |
| Discarding data used to represent selected media frames and generating repeat information in the bit stream such that a decoder can repeat the dropped frames; | 7 |
| Re-quantizing quantized DCT coefficients; new quantization scale X4 | 8, X4 |
| Extracting and changing the quantization scale factors; New quantization scale X5 | 9, X5 |

FIGS. 5-8 illustrate various sections of a system for transmission and reception of compressed media, according to preferred embodiments of the invention.

Figure 5:
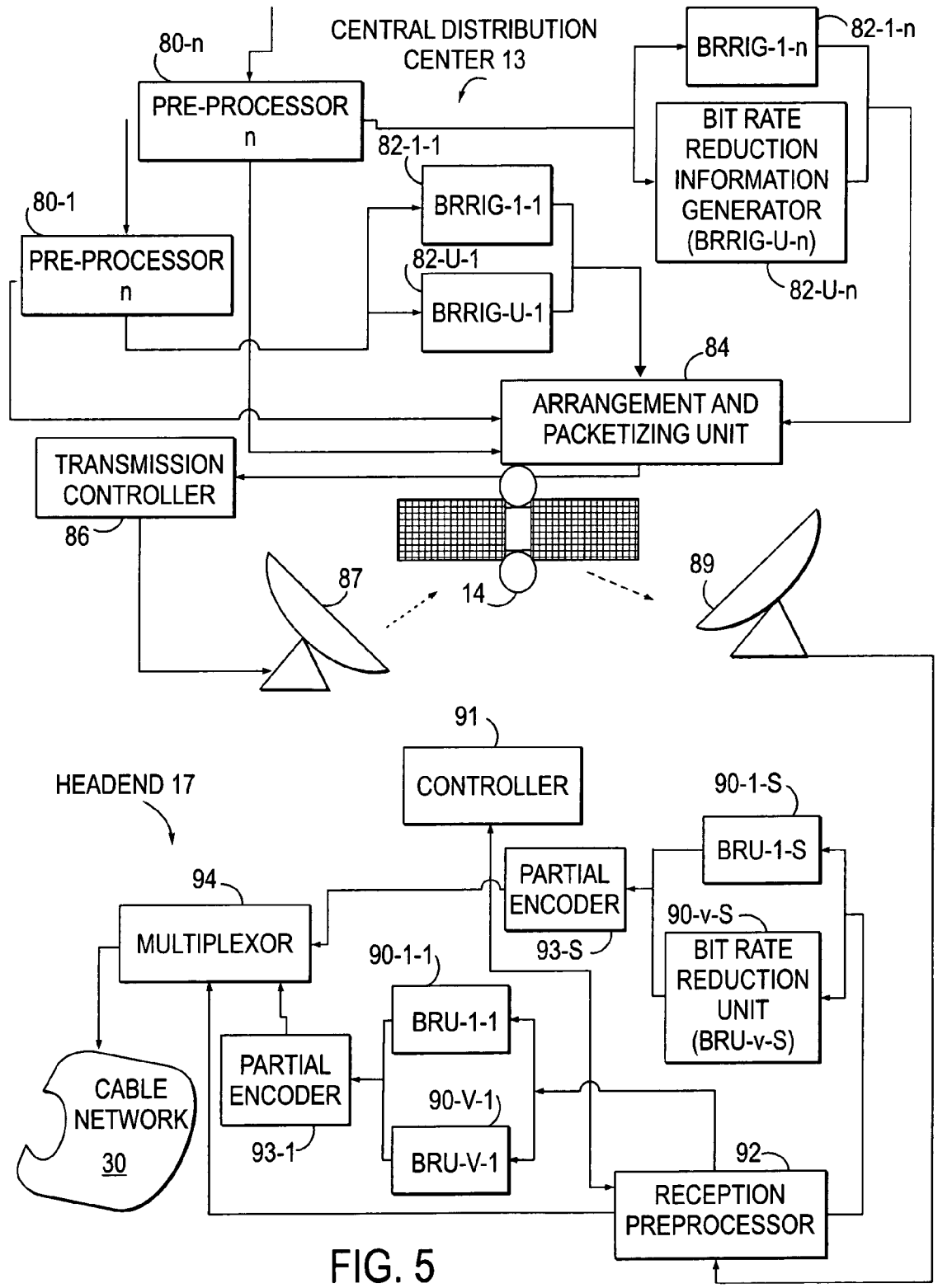
FIGS. 5-8 are schematic descriptions of a portions of headends and central distribution centers, in accordance with preferred embodiments of the present invention.
Figure 6:
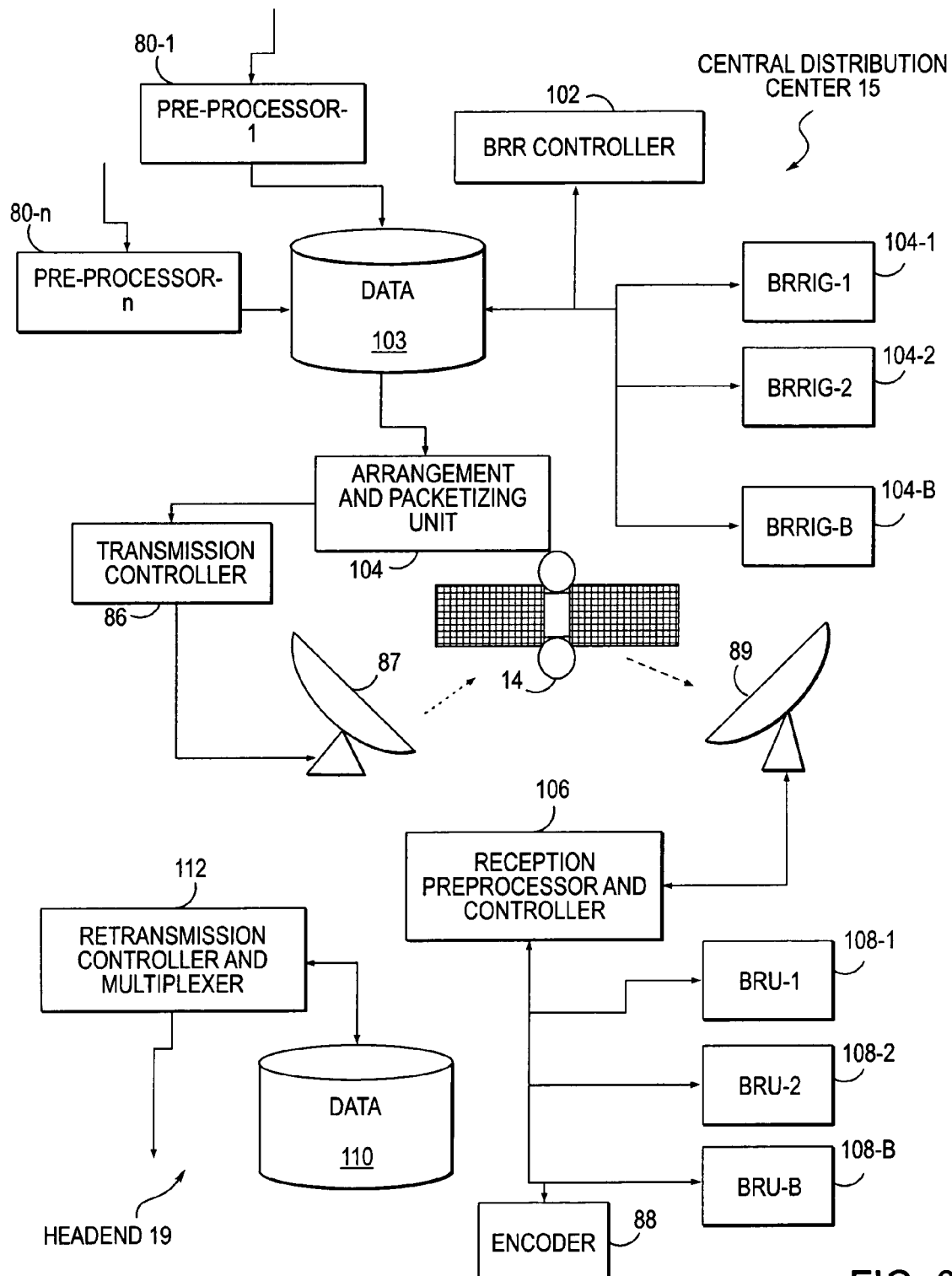

The upper parts of FIGS. 5 and 6 illustrate two implementations of central distribution centers denoted 13 and 15, while the lower part illustrates two implementations of headends, denoted headend 17 and headend 19.

FIGS. 5 and 6 illustrate parallel and serial configurations of the central distribution center. It is noted, for the purpose of the invention that the central distribution center may have many other configuration.

Bit rate conversion information generators and bit rate conversion units are configured to execute various bit rate conversion schemes, such as the schemes listed in TABLE 1, with various criteria, such as X1-X5.

The parallel configuration is illustrated at FIG. 5. Central distribution center 13 of FIG. 5 has n groups of bit rate conversion information generators BRRIG-f-j, f=1, 2, . . . U. Each group has U members. BRRIG-f-j are configured to work in parallel, in order to reduce any delay that results from the generation of the bit rate conversion information. This configuration is suited to real time applications, in which minimal delay is required. Distinct members of a group of bit rate conversion information generators are configured to implement different bit rate conversion techniques of the same media signals.

Central distribution center 13 of FIG. 5 and central distribution center 15 of FIG. 6 include n preprocessors 80-j, j=1, 2, . . . n, each. A preprocessor is configured to receive input media signals from media sources 10-j, (a) provide media signals to arrangement and packetizing unit 84, (b) perform preprocessing steps, such as extracting sections from the input media signals and performing partial decoding, to allow for provisioning of partially decoded input media signals to bit rate conversion information generators. For example, and as further illustrated at FIG. 8, the preprocessing step can include input channel specific demodulation and decoding, transport stream de-multiplexing and partial decoding, to provide a transform coefficient component, a motion vector component, and an auxiliary information component of compressed video signals to a bit rate conversion information generator.

Input signals, such as media signals and additional signals that are provided from preprocessor 80-j to arrangement and packetizing unit 84 are later multiplexed with bit rate conversion information provided by BRRIG-f-g. Media signals can arrive to a preprocessor in various forms, such as compressed form, raw form, channel specific encoded. In these cases the preprocessor can perform channel specific encoding and media compression before the media signals are provided to arrangement and packetizing unit.

The output of each of BRRIG-f-j is coupled to arrangement and packetizing unit 84 for providing bit rate conversion information. Arrangement and packetizing unit 84 further receives the input media signals, such as audio signals, video signals, additional data signals and control and status signals.

Arrangement and packetizing unit 84 combines the input media signals and the bit conversion signals and packetizes the combined signal to provide an enhanced primary packetized stream. The enhanced primary packetized stream can further be modulated and channel specific encoded by a transmission controller 86 for allowing the transmission of the enhanced primary channel via satellite dish 87 to distribution satellite 14.

Figure 7:
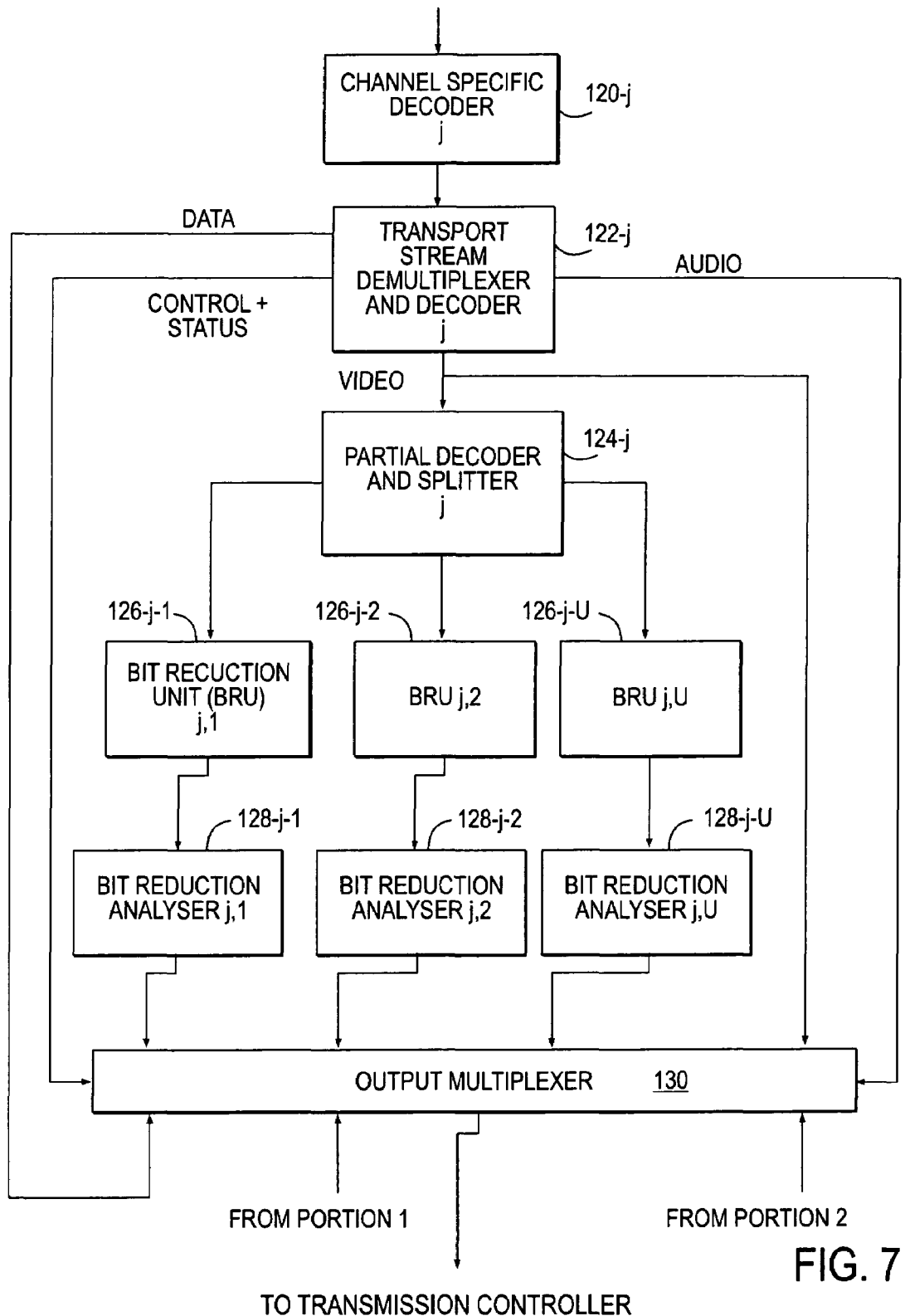

Central distribution center 13 includes n CDA (central distribution unit) portions; usually each CDA portion is configured to handle input media signals from a single media source. All these CDA portions are coupled to output multiplexer 94, analogues to output multiplexer 130 of FIG. 7. FIG. 7 illustrate the j'th CDA portion 13-j, in accordance with a preferred embodiment of the invention.

CDA portion 13-j includes channel specific decoder 120-j, transport stream demultiplexer and decoder 122-j, partial decoder and splitter 124-j, a plurality of bit rate conversion units 126-j-p, p=1, 2, . . . S; and a plurality of bit rate conversion analyzers 128-j-p.

Channel specific decoder 120-j and transport stream demultiplexer and decoder 122-j form preprocessor 80-j. They receive media signals, perform channel specific decoding and demultiplex the media stream into audio signals (AUDIO), a data signals (DATA), information and status signals (CONTROL+STATUS) and video signals (VIDEO). All signals are provided to output multiplexer 130. According to an aspect of the invention, bit conversion techniques are applied on video signals, but this is not necessary and bit conversion techniques can be applied on other signals such as audio signals.

The video signals are provided to partial decoder and splitter 124-j that splits the video signals to transform coefficient signals, motion vector signals and an auxiliary information signals, that are further partially decoded and provided to bit rate conversion units 126-j-p. The partial decoding can include various decoding steps, such as variable length decoding, quantization, inverse transform, to allow the implementation of various bit conversion techniques on the partially decoded video signals. The partially decoded signals are provided to bit rate conversion units 126-j-p that apply bit rate conversion techniques and provide bit reduced partially decoded video signals to bit rate conversion analyzers, that analyze these signal to generate bit rate conversion information, such as quality related information and bit rate conversion amount information.

The bit rate conversion information from bit rate conversion analyzers are provided to output multiplexer 130, that further receives video, audio, data and status and control information from the n CDA sections of central distribution center 13, and combines all these signals to provide the enhanced primary packetized stream.

According to an aspect of the invention at least one pair of bit rate conversion unit and a bit rate conversion analyzer are configured to perform a sequence of bit rate conversions according to at least one bit rate conversion scheme, to media streams and generate bit rate conversion information relating to the results of bit rate conversions along the sequence.

Central distribution center 15 of FIG. 6 is characterized by a serial configuration. Central distribution center 15 has B bit rate conversion information generators BRRG-d 104-d, d=1, 2, . . . B, that are coupled in parallel to BRR controller 102 and to storage unit 103, for processing the media streams originating from at least one preprocessor unit at a time. Preprocessors 80-j provide media signals and preprocessed media signals to storage unit 103. BBR controller 102 is configured to retrieve the preprocessed media signals and to provide them to BRRG-1-BRRG-B. BRR-1-BRRG-B process the preprocessed media signals and provide bit rate conversion information to storage unit 103. The media signals and the bit rate conversion information are fetched from storage unit 103, multiplexed and packetized to form transport packets by arrangement and packetizing unit 104, are than sent via transmission controller 86 to satellite dish 87.

Central analyzer CA 12"-2 of FIG. 2 is analogues to BRR controller 102 and BRRG-1-BRRG-B of FIG. 6 and to BRRIG-1-1-BRRIG-A-n of FIG. 5.

Headend 17 of FIG. 5 includes reception preprocessor 92, S groups of U bit rate conversion units BRU-h-p 90-h-p, h=1, 2, . . . V, S<=n, V<=U; controller 91, partial encoders 93-p and multiplexer 94. Reception preprocessor 92 receives signals from satellite dish 89, performs channel specific decoding, de-multiplexing and preprocessing steps such as extracting sections from the media streams and performing partial decoding, and the like, to allow a provision of partially encoded media signals to selected bit rate conversion units. Reception preprocessor 92 also extracts bit rate conversion information and provides the bit rate conversion information to controller 91. Controller 91 receives the bit rate conversion information and determines whether to reduce the bit rate of a sequence of media signals, and how to reduce the bit rate, in view of the bit rate conversion information and additional information, such as but not limited to priority of media sequences and previous bit rate conversion decisions. Said determination is reflected by a selection or a bypass of bit rate conversion units, to achieve an optimal match between the available bandwidth of cable network 30 and the aggregate bit rate of media signals sent from headend 17 to cable network 30. Media signals that were partially encoded by reception preprocessor 92 are provided to partial encoders 93-1-93-S to provide encoded media signals. The encoded media signals, and media signals that were not partially encoded and decoded such as data, control and status signals and audio signals, are provided to multiplexer 94 that multiplexes the signals and provides a secondary enhanced signal to be provided to a downstream channel, such as cable network 30.

According to an aspect of the invention, when bit rate conversion information relating to a sequence of bit rate conversions is received and the first of the bit rate conversion scheme is implemented at headend 17 or 19, the information relating to the first bit rate conversion is discarded, and the remaining bit rate conversion information is updated such that it does not refer to the first bit rate conversion scheme. An enhanced secondary packetized stream can include the resulting bit rate conversion information.

Headend 19 of FIG. 6 is characterized by a serial configuration. Headend 19 has B bit rate conversion units BRU-d 108-*d* that are coupled in parallel to storage unit 110 and are controlled by reception preprocessor 106. Reception preprocessor 106 is configured to receive signals from satellite dish 89, perform channel specific decoding, de-multiplex and perform preprocessing steps such as extracting sections from the media streams and performing partial decoding, and the like, to allow a provision of partially encoded media signals to storage unit 100 and eventually to selected bit rate conversion units. Channel specific encoding involves encoding and modulating information signals in a manner that allows the signals to be transmitted to distribution satellites such as distribution satellite 14, and to be retransmitted to headends, such as headend 17 having satellite dish 89. Channel specific decoding allows for receiving channel specific encoded media signals and convert them to generate reconstructed media signals.

Reception preprocessor 106 also extracts bit rate conversion information and determines whether to change the bit rate of a sequence of media signals, and how to change the bit rate, in view of the bit rate conversion information and additional information, such as but not limited to priority of the media signal sequences and previous bit rate conversion decisions. Said determination is reflected by a selection or a bypass of bit rate conversion units, to achieve an optimal match between the available bandwidth of the downstream channel and the aggregate bit rate of media signals sent from headend 17 to the downstream channel. Reception preprocessor 106 is further coupled to bit rate conversion units BRU-d to control the retrieval of media signal sequences to the various bit rate conversion unit, the provision of reconstructed media signals to partial encoder 88, the generation of partially encoded media signals, the storage of the partially encoded media signals to storage unit 110, and the provision of media signals, partially encoded media signals from storage unit to multiplexer 112. Multiplexer 112 is configured to combine the partially encoded media signals, media signals that were not partially encoded and decoded such as data, control and status signals and audio signals to provide an enhanced secondary multiplexed output signal to cable network 30. According to an aspect of the invention, the enhanced secondary packetized stream includes bit conversion information, for allowing additional changes in the bit rate of the media signals.

Figure 8:
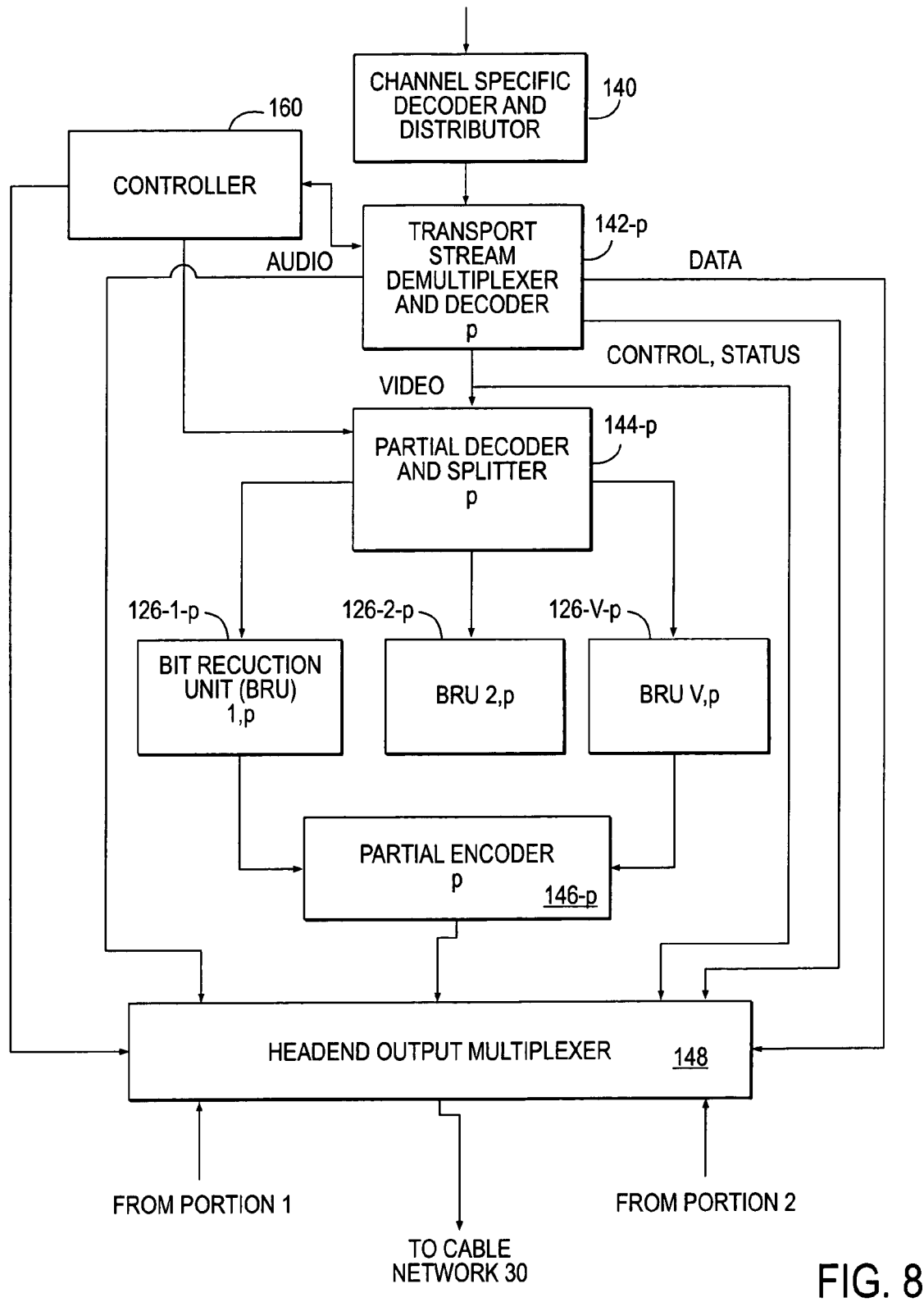

Headend 17 has S headend portions, S is either smaller or equal to n, as a headend can be configured to perform grooming. Grooming involves (a) the reception of media signals, such as media signal that form a digitized program, origination from up to n media sources, (b) a selection of media signals originating from S selected sub-group of media sources. Conveniently, each headend portion is configured to handle media signals from a single media source. All these portions are coupled to headend output multiplexer 148. FIG. 8 illustrate the h'th headend portion 17-*h* of headend 17 of FIG. 5, in accordance with a preferred embodiment of the invention.

Hedend portion 17-*h* is coupled to channel specific decoder and distributor 140, and includes transport stream demultiplexer and decoder 142-*h*, controller 160, partial decoder and splitter 144-*h*, and plurality of bit rate conversion units BRU-*h*-*p* 126-*h*-*p*.

Channel specific decoder and distributor 140 receives a plurality of media signals sequences, performs channel specific decoding and distributes various media signals streams to various portions of headend 17, such as portion 17-*h*.

Channel specific decoder and distributor 140 and transport stream demultiplexer and decoder 142-*h* belong to reception preprocessor 92 of FIG. 5. They receive media signals, perform channel specific decoding, distribute the signals among various portions of the headend and demultiplex the media stream into audio signals (AUDIO), data signals (DATA), information and status signals (CONTROL+STATUS) and video signals (VIDEO). All sections are provided to headend output multiplexer 148. The video section is provided to partial decoder and splitter 144-*h* that splits the video section to a transform coefficient section, a motion vector section and an auxiliary information section, that are further partially decoded and provided to bit rate conversion units 126-*h*-*p*. The partial decoding can include various encoding steps, such as variable length encoding, quantization, inverse transform, to allow the implementation of various bit rate conversion techniques on the partially decoded video signals. The partially decoded signals are provided to selected bit rate conversion units 126-*h*-*p* that apply bit rate conversion techniques and provide bit rate reduced partially decoded video signals to partial encoder 146-*h*. Partial encoder 146-*h* performs partially encoding, to inverse the partial decoding performed by partial decoder and splitter 144-*h*, and provides encoded signals to headend output multiplexer 148. Headend output multiplexer 148 receives video, audio, data and status and control information from the S headend sections, and combines all these signals to provide a combined signal, such as enhanced secondary packetized stream, to cable network 30.

Figure 9:
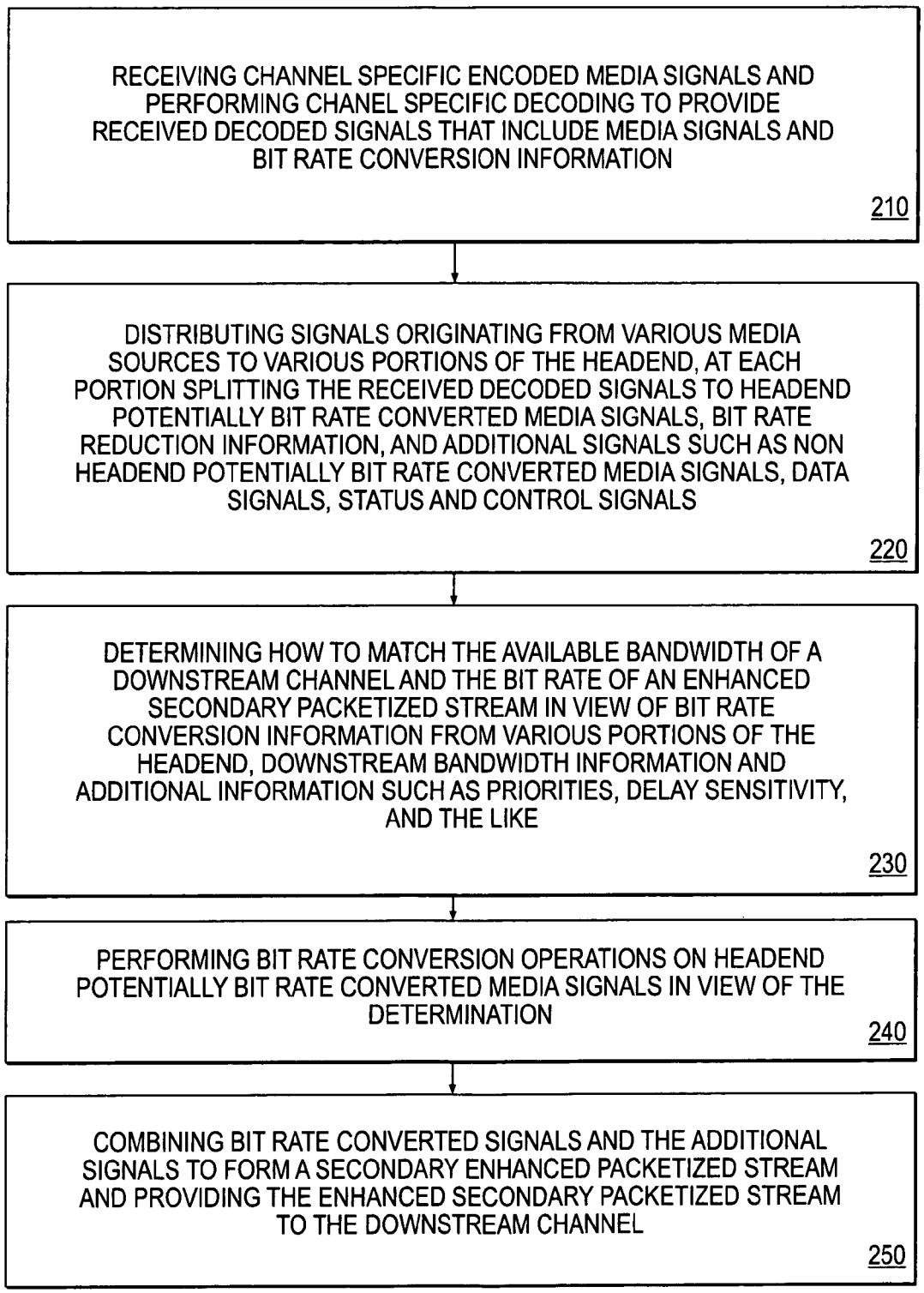
FIGS. 9-10 are flow charts illustrating methods for the generation and transmission of media signals and bit rate conversion information.
Figure 10:
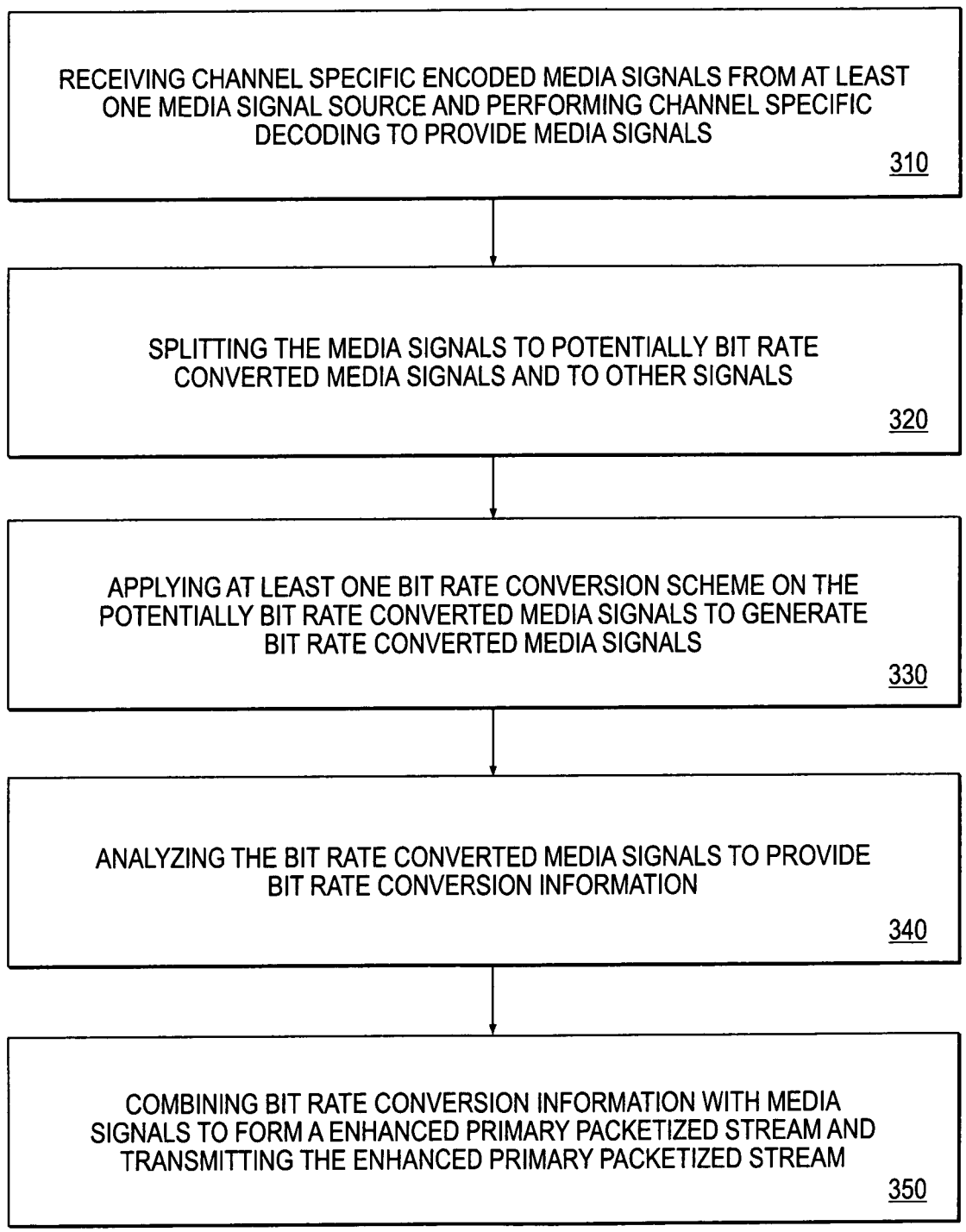

FIGS. 9 and 10 are flow chart diagram illustrating a methods 200 and 300 respectively, for performing bit rate conversion of media signals to use an available bandwidth of a channel, and for generating a combined signal including media signals and bit rate conversion information, according to a preferred embodiment of the invention. For convenience of explanation only, it is assumed that the media signals are MPEG compliant, the enhanced primary packetized stream is arranged in MPEG compliant transport packets, and that the media signals are transmitted from the j'th portion of central distribution center illustrated in FIG. 7 and are received at the headend portion 17-*h* illustrated in FIG. 8.

Method 200 starts at step 210 of receiving channel specific encoded media signals and performing channel specific decoding to provide received decoded signals that include media signals and bit rate conversion information signals. The bit rate conversion information being indicative of a change in a size/bit rate of sequences of media signals resulting from bit rate conversion. The media signals are conveniently compressed and multiplexed. Conveniently, the bit rate conversion information also indicates a quality degradation resulting from the bit rate conversion. For example, referring to the example set forth at FIGS. 3 and 7, a plurality of MPEG transport packets such as TP-z are received by satellite dish 89 and are provided to reception preprocessor 92 to be channel specific decoded. The plurality of MPEG transport packets include bit rate conversion information, such as the information within fields DS-2-1-1, BRT-2-1-1, BRA-2-1-1, QD-2-1-1, indicating the bit conversion scheme applied on a sequence of media signals, the amount of compression/bit rate conversion achieved and the quality degradation.

Step 210 is followed by step 220 of distributing media signals sequences among at least one portion of the local distribution center and splitting the received signals to (a)

media signals that can be bit rate converted at the local distribution center, (b) bit rate conversion information, (c) and additional signals such as media signals that can not be bit rate converted, data signals, status and control signals. For example, referring to the example set forth in the previous Figures, transport stream demultiplexer and decoder 142-p receives the output signals from channel specific decoder and distributor 140 to output audio signals (AUDIO), data signals (DATA), information and status signals (CONTROL+STATUS) and video signals (VIDEO).

Step 220 is followed by step 230 of determining how to match the available bandwidth of a downstream channel and the bit rate of a combined signal, such as the enhanced secondary packetized stream, to be transmitted over the downstream channel. Referring to the example set forth in the previous Figures, step 230 involves a reception of bit conversion information from all the headend portions that received media signals, and determining whether a bit conversion is necessary, and if so—which bit conversion schemes are to be implemented on which media signals. The determination is based upon the bit rate conversion information, the available bandwidth of the downstream channel and additional information such as media signals priorities, previous bit rate conversion decisions, quality degradation and the like. For example, partial decoders and splitters 144-1-144-V provide controller 160 bit rate conversion information, controller 160 determines which media signal sequence to convert, and sends control signals for activating selected bit conversion units to implement the determination.

Step 230 is followed by step 240 of performing bit rate conversion in response to the determination. Referring to FIG. 8, if bit rate conversion is required, the appropriate bit conversion unit is provided with the media signals to be reduced, and performs bit rate conversion to provide reduced media signals to partial decoder 146-p.

Step 240 is followed by step 250 of combining bit rate converted media signals and additional signals, such as media signals that were not bit rate converted, data signals, control and status signals, and the like to form a combined signal, such as the enhanced secondary packetized stream, to be sent over a downstream channel. According to an aspect of the invention, step 240 further includes a step of adding bit rate conversion signals to the combined signal. As some of the bit rate conversion signals are irrelevant, due to changes in the bit rate converted media signals, they can be dropped. For example, when bit rate conversion information indicative of a sequence of bit rate conversions is included in the enhanced primary packetized stream, and the first bit rate conversion scheme of the sequence is implemented during step 240, then the bit rate conversion information is updated such the first bit rate conversion scheme is discarded. According to yet a further aspect of the invention the bit rate conversion information includes previous bit rate conversion decisions.

Referring to FIG. 10 illustrating method 300 for generating bit rate conversion information, according a preferred embodiment of the invention.

Method 300 starts at step 310 of receiving channel specific encoded signals from at least one media signal source and performing channel specific decoding to provide media signals. Referring to the example set forth in previous Figures, central distribution center 12" received a plurality of media signals from media sources. Assuming that the signals were provided by the j'th media source, they are received at the channel specific decoder 120-j, decoded and provided to transport stream demultiplexer and decoder 122-j.

Step 310 is followed by step 320 of splitting the media signals to potentially bit rate converted media signals and to other signals. Potentially bit rate converted media signals are media signals that can be bit rate converted by the device that is used to implement method 300 or at least step 330 of method 300. Referring to the example set forth in previous Figures, transport stream demultiplexer and decoder 122-j splits the signals to data signals, control and status signals, audio signals and video signals. All these signals are provided to output multiplexer 130, while the video signals are also provided to partial decoder and splitter 124-j.

Step 320 is followed by step 330 of applying at least one bit rate conversion scheme on the potentially bit rate converted media signals to generate bit rate converted media signals. Referring to the example set forth in previous Figures partial decoder and splitter 124-j partially decodes the video signals and provides partially decoded video signals to bit conversion units BRU 126-j-p, for implementing at least one bit conversion scheme on partially decoded video signals to provide at least bit rate converted media signals.

Step 330 is followed by step 340 of analyzing the bit rate converted media signals to provide bit rate conversion information. Referring to the example set forth in previous Figures, bit rate converted analyzers 128-j-f analyze the bit rate reduced media signals and generate bit rate conversion information being indicative of the bit rate conversion achieved by the appliance of bit rate conversion schemes on the media signals and optionally provide quality signals being indicative of a quality loss resulting from the bit rate conversion. According to an aspect of the invention, bit rate conversion information relating to a sequence of bit rate conversions are generated by repeating steps 330 and 340.

Step 340 is followed by step 350 of transmitting bit rate conversion information and transmitting the media signals. Conveniently, the bit rate conversion information and multiplexed with the media signals to provide a combined signal, such as the enhanced primary packetized stream, to be later transmitted to a plurality of receivers, such as local distribution centers.

It will be appreciated by persons skilled in the art that the present invention is not limited to what has been particularly shown and described hereinabove. Rather the scope of the present invention is defined only by the claims, which follow.

We claim:

1. In a distribution center configured to transmit a plurality of media streams, a method for generating and transmitting bit rate conversion information, the method comprising: receiving at least one media stream, the at least one media stream to be transmitted over a communication channel; applying at least one bit rate conversion scheme on the at least one media stream; analyzing the results of the appliance of the at least one bit rate conversion scheme to provide bit rate conversion information; wherein the steps of applying and analyzing are repeated to produce bit rate conversion information indicative of results of an appliance of a sequence of bit rate conversion schemes on the at least one media stream; wherein the method further comprises transmitting the bit rate conversion information and the at least one media stream until there is a need to convert the bit rate of a media stream out of the at least one media stream by applying a first bit rate conversion scheme out of the sequence of bit rate conversion schemes; and applying the first bit rate conversion scheme by a receiver, and discarding bit rate conversion information relating to a first bit rate conversion information to provide modified bit rate conversion information.

* * * * *